Feb. 21, 1956 P. HUBMANN 2,735,614
APPARATUS FOR STANDARDIZING MILK
Filed Feb. 20, 1951 2 Sheets-Sheet 1
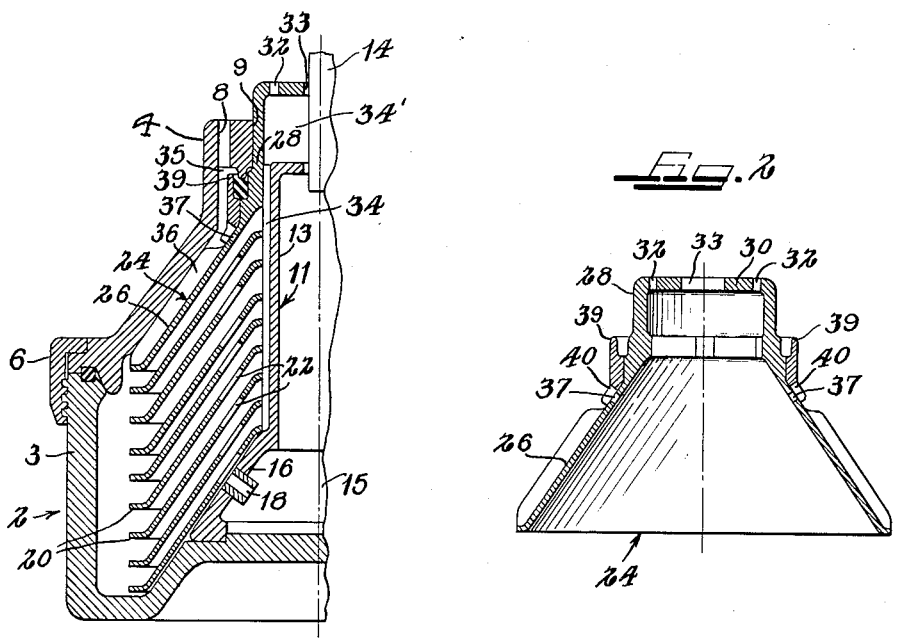
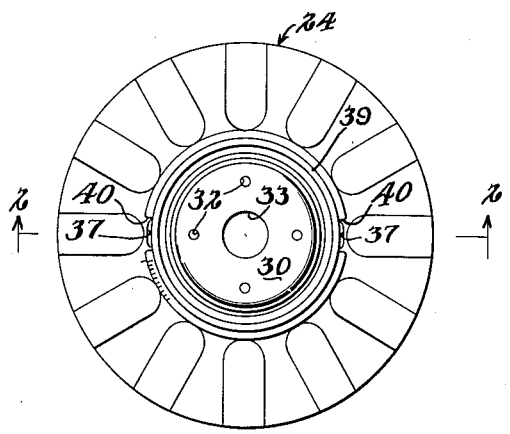
Inventor
Paul Hubmann
by Morris Spector
Atty.

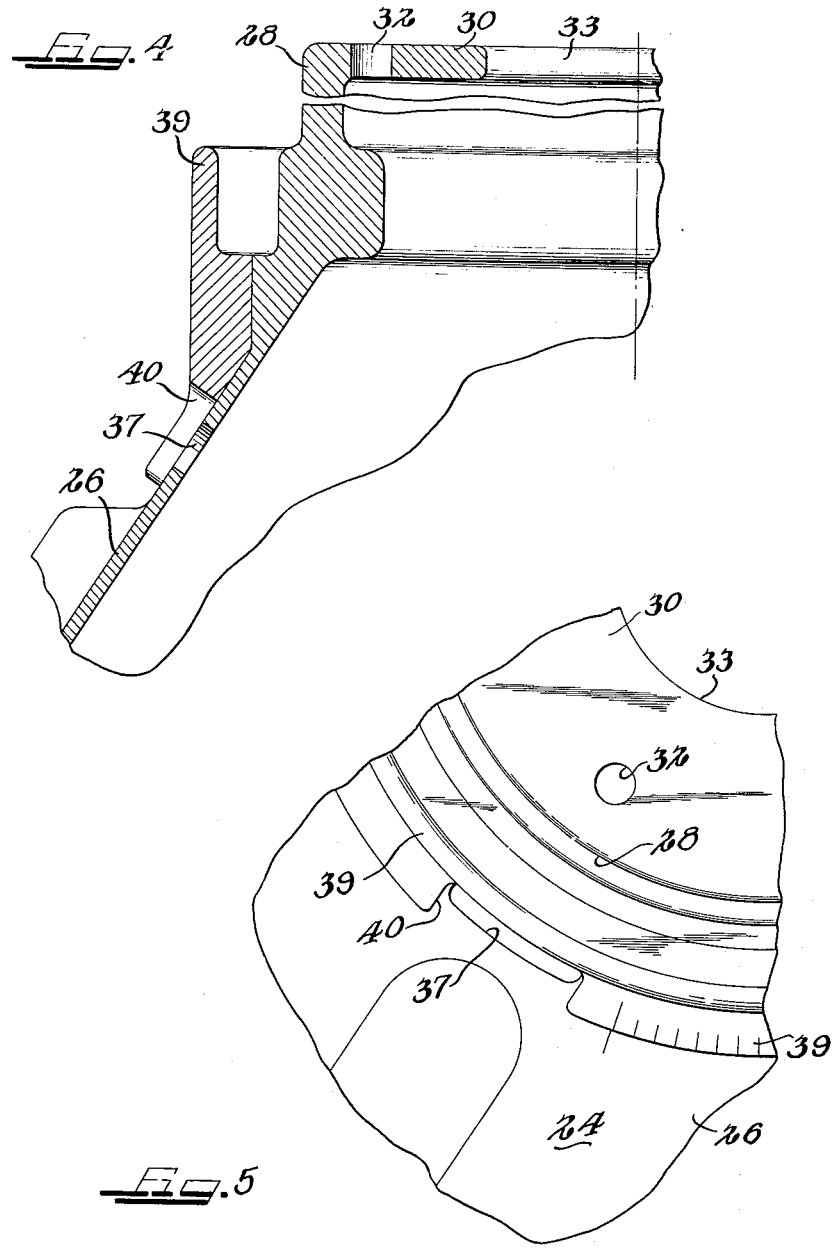

United States Patent Office 2,735,614
Patented Feb. 21, 1956

2,735,614

APPARATUS FOR STANDARDIZING MILK

Paul Hubmann, Cham Zug, Switzerland, assignor, by mesne assignments, to Package Machinery Company, a corporation of Massachusetts Application February 20, 1951, Serial No. 211,929

3 Claims. (Cl. 233—29)

This invention relates to centrifugal apparatus for standardizing milk with respect to its butter fat content, that is, to apparatus for extracting cream from raw milk in such amounts as to leave the milk with a fixed butter fat content.

It is one of the objects of the present invention to provide a centrifugal machine that may be supplied with raw milk as a continuous process and which will produce milk of a standard butter fat content and deliver the excess part as separated cream.

It is now desired that the milk separator also separate milk partially, that is, standardize milk to a certain fat content. This is now accomplished by completely separating the milk and then adding to the skim milk part of the cream. This process has a disadvantage in that the cream will never again be equally distributed in the skim milk.

The proposed invention consists of a process which makes it possible to standardize milk without first completely separating it and then remixing it with cream.

Figure 1 shows a one-half longitudinal section through the rotatable apparatus of the present invention;

Figure 2 shows the cross section of the standardizing device forming part of the apparatus of Fig. 1 and taken along section line 2—2 in Fig. 3;

Figure 3 shows the plan of the standardizing device;

Figure 4 shows an enlarged detail drawing of the standardizing device; and

Figure 5 shows an enlarged plan of the standardizing device.

Reference should now be made to the drawings where similar reference numerals indicate similar elements throughout.

The milk separating apparatus 1 of the invention includes a rotatable assembly having a drum 2 comprising a bottom drum part 3 and a dome 4 held together by a nut 6. The top of the dome 4 has an off-centered discharge opening 8 and a central opening 9.

Supported within the drum is a distributor 11 having a hollow neck 13 which receives milk from an inlet channel 14. The distributor has a hollow base 16 defining a distributor compartment 15. The distributor base 16 has one or more upwardly inclined channels 18 located radially outward of the distributor neck.

Surrounding the distributor neck are a stack of axially spaced separating discs 20 which have off-centered passage holes or openings 22.

At the top or upper end of the stack of discs 20 is a standardizing device for adjusting the butter fat content of milk flowing from the drum 2 in a manner to be explained. The device includes an upper end separating disc 24 which has a skirt 26 and a neck 28 which projects through the central opening 9 of the dome 4. The neck 28 has a top wall 30 in which are formed a number of off-centered holes 32 and a central hole 33.

At the inner ends of the axially spaced separating discs 20 there is a cream-receiving passageway 34 which leads into a space 34'.

Passages 36 are defined between the conical skirt 26 of the end disc 24 and the dome 4 which passages communicate with the discharge opening 8 in the dome via a mixing chamber 35 formed between the dome 4 and the neck of the end disc 24. When the drum is rotated, skim milk enters the passageways 36 through the space between the ends of the separating discs 20 and the drum.

Access to the discharge opening 8 in the top of the dome 4 is also made through openings 37—37 formed in the skirt 26 of the end disc 24. An adjusting ring 39 is rotatably mounted upon the end disc 24. The ring has a pair of peripheral openings 40—40 formed therein which are movable into registration with the openings 37—37 respectively. By turning the adjusting ring to either side of the position where its openings 40—40 are in registry with the openings 37—37, the amount of unseparated milk passing through the openings into the mixing chamber 35 can be gradually varied.

The operation of the apparatus is as follows:

With the adjusting ring 39 in a position which only partially uncovers the disc openings 37—37, milk flowing through the inlet channel 14 will pass into the space between the separating discs 20 via the distributor base openings 18. As the drum 1 is rotated, part of the milk flows upward through the separator disc openings 22 to pass through the skirt openings 37—37 into the mixing chamber 35 without having been subjected to appreciable centrifugal separating action. The rest of the milk flows between the separator discs 20 where it is separated into the heavier skim milk and the lighter cream by centrifugal action. The heavier skim milk will flow away from the drum axis in the spaces between the separating discs 20. The skim milk then flows into the passages 36 between the end separating disc 24 and the dome 4 and then into the mixing chamber 35 where it mixes with the aforementioned unseparated milk. By adjustment of the adjusting ring 39, the percentage of butter fat in the mixture of unseparated milk and skim milk passing out of the discharge opening 8 can be controlled.

The lighter cream flows in a direction toward the drum axis and therefore enters the passageway 34 and passes up and out through the openings 32 in the top wall of the end disc.

When the end separating disc openings 37—37 are completely uncovered, all of the incoming milk will pass up through the separating disc holes 22 and through the end separating disc openings 37—37 and out the discharge openings 8.

I claim:

1. A centrifugal separator having rotatable means forming a separating space and provided with the usual stack of spaced apart centrifugal separating discs, said discs having axially aligned off center openings therein for permitting the passage of liquid into the space between the discs, whereby any liquid in the space between the discs at the openings is subjected to some centrifugal action and the heavier materials move radially outwardly while the lighter materials move radially inwardly, means for delivering liquid to the off center opening at an end disc of the stack of discs and withdrawing some liquid from the off center opening of the opposite end disc of the stack of discs as a continuous stream, whereby that withdrawn liquid has moved through the aligned openings in the stack of discs and been subjected to a minimum of centrifugal action, means for adjusting the volume of that stream, said separator having a discharge outlet for the lighter materials that move from the off center openings in a direction toward the axis of rotation of said rotatable means and means for withdrawing liquid from the periphery of the stack of discs as a continuous stream.

2. A centrifugal separator having rotatable means forming a separating space and provided with the usual stack of spaced apart centrifugal separating discs, said discs having axially aligned off center openings therein for permitting the passage of liquid into the space between the discs, whereby any liquid in the space between the discs at the openings is subjected to some centrifugal action and the heavier materials move radially outwardly while the lighter materials move radially inwardly, means for delivering liquid to the off center opening at an end disc of the stack of discs and withdrawing some liquid from the off center opening of the opposite end disc of the stack of discs as a continuous stream, whereby that withdrawn liquid has moved through the aligned openings in the stack of discs and been subjected to a minimum of centrifugal action, means for adjusting the volume of that stream, means for withdrawing liquid from the periphery of the stack of discs as a continuous stream, means for mixing the first stream without additional centrifuging with the second stream whereby said mixed stream contains liquids that have been subjected to two different degrees of centrifugal separation said separator having a discharge outlet for the lighter materials that move from the off center openings and in a direction toward the axis of rotation of said rotatable means.

3. A centrifugal separator having rotatable means forming a separating space and provided with the usual stack of spaced apart centrifugal separating discs, said discs having axially aligned off center openings therein for permitting the passage of liquid into the space between the discs, whereby any liquid in the space between the discs at the openings is subjected to some centrifugal action and the heavier materials move radially outwardly while the lighter materials move radially inwardly, means for delivering liquid to the off center opening at an end disc of the stack of discs and withdrawing some liquid from the off center opening of the opposite end disc of the stack of discs as a continuous stream, whereby that withdrawn liquid has moved through the aligned openings in the stack of discs and been subjected to some centrifugal action, means for adjusting the volume of that stream, means for withdrawing liquid from the radially innermost part of the stack of discs as a continuous stream, means for withdrawing liquid from the radially outermost parts of the stack of discs as a continuous stream, and means for mixing the first mentioned stream without additional centrifugal separation with one of the two last mentioned streams.

References Cited in the file of this patent

UNITED STATES PATENTS

| | | |
|---|---|---|
| 1,081,304 | Hauberg | Dec. 16, 1913 |
| 2,169,300 | Svensson | Aug. 15, 1939 |
| 2,325,871 | Muerle | Aug. 3, 1943 |

FOREIGN PATENTS

| | | |
|---|---|---|
| 70,279 | Sweden | July 2, 1929 |